United States Patent
Fujio

(10) Patent No.: US 11,186,451 B2
(45) Date of Patent: Nov. 30, 2021

(54) CONVEYING AND SORTING APPARATUS

(71) Applicant: Daifuku Co., Ltd., Osaka (JP)

(72) Inventor: Yoshihiko Fujio, Shiga (JP)

(73) Assignee: Daifuku Co., Ltd.

( * ) Notice: Subject to any disclaimer, the term of this patent is extended or adjusted under 35 U.S.C. 154(b) by 0 days.

(21) Appl. No.: 16/941,244

(22) Filed: Jul. 28, 2020

(65) Prior Publication Data
US 2020/0354163 A1 Nov. 12, 2020

Related U.S. Application Data

(63) Continuation of application No. PCT/JP2019/010356, filed on Mar. 13, 2019.

(30) Foreign Application Priority Data

Apr. 27, 2018 (JP) .............................. JP2018-086871

(51) Int. Cl.
*B65G 47/94* (2006.01)
*B65G 15/42* (2006.01)
*B65G 23/06* (2006.01)
*B65G 35/06* (2006.01)

(52) U.S. Cl.
CPC .......... *B65G 47/945* (2013.01); *B65G 15/42* (2013.01); *B65G 23/06* (2013.01); *B65G 35/06* (2013.01)

(58) Field of Classification Search
CPC ...... B65G 47/94; B65G 47/945; B65G 47/96; B65G 47/38; B65G 15/42; B65G 15/44; B65G 35/06; B65G 17/02; B65G 23/06
See application file for complete search history.

(56) References Cited

U.S. PATENT DOCUMENTS

| | | | | |
|---|---|---|---|---|
| 4,279,337 A | * | 7/1981 | Kachnik | ............... B65G 35/06 104/165 |
| 5,474,415 A | * | 12/1995 | Becker | ................. B65G 47/962 198/349 |
| 6,123,028 A | * | 9/2000 | Bellezza | ............... B65G 35/06 104/172.3 |

(Continued)

FOREIGN PATENT DOCUMENTS

| | | |
|---|---|---|
| JP | 46039621 B1 | 11/1971 |
| JP | 48014474 Y1 | 4/1973 |

(Continued)

*Primary Examiner* — William R Harp
(74) *Attorney, Agent, or Firm* — St. Onge Steward Johnston & Reens LLC

(57) ABSTRACT

A conveying and sorting apparatus has a plurality of tilting conveyor units in a row in the conveying direction. Each tilting conveyor unit is able to switch between a horizontal conveying orientation and a tilted orientation for ejecting the object being conveyed, by means of gravity, laterally with respect to the conveying direction and has a belt conveyor with a plurality of ridge portions which extend in the width direction on the inside surface, and on the outside surface the ridge portions which extend in the width direction are provided an equivalent intervals in the length direction of the belt. A plurality of recessed grooves which engage with each of the ridge portions on the inside surface of the belt are provided to the peripheral surfaces of a front pulley and a rear pulley of the belt.

1 Claim, 9 Drawing Sheets

(56) References Cited

U.S. PATENT DOCUMENTS

| | | | | |
|---|---|---|---|---|
| 6,957,736 | B2 * | 10/2005 | Bonifer | ............... B65G 15/12 |
| | | | | 198/583 |
| 9,878,852 | B2 * | 1/2018 | Sorensen | ............ B65G 47/945 |
| 10,494,193 | B2 * | 12/2019 | Sorensen | ............ B65G 47/962 |

FOREIGN PATENT DOCUMENTS

| | | | |
|---|---|---|---|
| JP | 1977064483 | A | 5/1977 |
| JP | 04129943 | A | 4/1992 |
| JP | 06032428 | A | 2/1994 |
| JP | 08133445 | A | 5/1996 |
| JP | 10087060 | A | 4/1998 |
| JP | 2015501770 | A | 1/2015 |
| WO | 2013075714 | A1 | 5/2013 |

* cited by examiner

CONVEYING AND SORTING APPARATUS

FIELD OF THE INVENTION

The present invention relates to a conveying and sorting apparatus capable of laterally sliding and sorting a conveyed object by gravity at a sorting position set on a conveying path of the conveyed object.

BACKGROUND OF THE INVENTION

As the conveying and sorting apparatus as described above, as described in Patent Literature 1, there is known a conveying and sorting apparatus including a plurality of tilting conveyor units arranged in a row in a conveying direction, each of the tilting conveyor units configured to be switchable in orientation about a support shaft parallel to the conveying direction of the conveyed object between a horizontal conveying orientation and a tilted orientation for discharging the conveyed object laterally with respect to the conveying direction of the conveyed object by gravity, and including a conveying conveyor for the conveyed object.

CITATION LIST

Patent Literature

Patent Literature 1: Japanese Translation of International Application (Kohyo) No. 2015-501770

SUMMARY OF THE INVENTION

Technical Problem

In the configuration of the above-described Patent Literature 1, a general belt conveyor using a timing belt is used as a conveying conveyor for conveying the conveyed object on each tilting conveyor unit in order to reliably convey the conveyed object at a set speed. It has been found that the following problems arise in a conveying and sorting apparatus configured by arranging tilting conveyor units including such a belt conveyor in a row. That is, although there is no problem with a belt conveyor which conveys the conveyed object on a general horizontal conveying path, for example, in a system for conveying and sorting luggage at airports, the conveying and sorting is performed by placing the to-be-conveyed object (luggage) on a tray having a size suitable for a conveying path of the conveying and sorting apparatus because various types of luggage different in size, bottom surface shape, and weight are handled. Further, the conveying speed is also set to a relatively high speed because a dedicated tray is used together.

Under the circumstances as described above, a flat bottom surface of the tray and a flat surface of the conveyor belt are in surface contact with each other, so that a frictional force between them is increased. Because of this, the conveyor belt is pulled by the tray and is more likely to integrally move laterally in a lateral movement direction of the tray although the tray needs to, even though distance-wise slightly, smoothly sideslip with respect to the belt conveyor at the time of swinging of the tilting conveyor unit from the horizontal orientation to the tilted orientation in the first half of the sorting operation and at the time of swinging of the tilting conveyor unit from the tilted orientation to the horizontal orientation in the latter half of the sorting operation. As a result, the conveyor belt (timing belt) sideslips in a pulley axial direction with respect to a pulley. Generally, in the belt conveyor using the timing belt, flanges sandwiching the belt from both left and right sides are attached on both sides in the axial direction of the pulley. As a result, a relative slip in a pressure contact state occurs between the flange and a side of the conveyor belt when the conveyor belt enters and leaves the pulley, and the side of the conveyor belt is extremely worn, which leads to generation of dust and an extreme reduction in the service life of the conveyor belt.

The present invention proposes a conveying and sorting apparatus capable of solving the conventional problems as described above. Described by giving reference signs in parentheses used in the description of embodiments described below in order to facilitate understanding the relationship with the embodiments, the conveying and sorting apparatus according to the present invention is a conveying and sorting apparatus including a plurality of tilting conveyor units (10, 11) arranged in a row in a conveying direction, each of the tilting conveyor units (10, 11) configured to be switchable in orientation about a support shaft (7) parallel to a conveying direction of a conveyed object between a horizontal conveying orientation and a tilted orientation for discharging the conveyed object laterally with respect to the conveying direction of the conveyed object by gravity, and also including a conveying conveyor for the conveyed object, in which the conveying conveyor is composed of a belt conveyor (24a, 24b) having a belt (26c) stretched between a pair of front and rear pulleys (26a, 26b), and the belt (26c) of the belt conveyor (24a, 24b) has an inside surface provided with a plurality of ridge portions (47) along a belt longitudinal direction at appropriate intervals in a width direction and has an outside surface provided with ridge portions (48) along the width direction at regular intervals in the belt longitudinal direction, the pair of front and rear pulleys (26a, 26b) are not provided with flange portions sandwiching both sides of the belt (26c) and are provided, on circumferential surfaces, with a plurality of recessed grooves (49) into which the ridge portions (47) on the belt inside surface are individually fitted.

Effects of Invention

According to the configuration of the present invention described above, the frictional force in the rotational direction between the pair of front and rear pulleys and the belt is remarkably increased by the fitting of the plurality of ridge portions on the belt side and the plurality of recessed grooves on the pulleys side as compared with the case where the pulley having the simply flat circumferential surface abuts the flat belt. Further, the existence of the ridge portions in the width direction on the belt surface increases the sliding resistance in the belt longitudinal direction of the conveyed object (tray) with respect to the belt. Thus, the rotational driving force applied to one of the pair of front and rear pulleys can be reliably transmitted to the belt and the rotational force of the belt can be reliably transmitted to the conveyed object (tray). As a result, the configuration of the present invention is similar to the conventional case of using the timing belt, and the conveyed object (tray) can be reliably conveyed at a set speed.

Further, although the flange portions sandwiching the both sides of the belt are not provided to the pair of front and rear pulleys, the belt is strongly blocked from freely moving in the pulley axial direction with respect to the pulleys by the fitting of the plurality of ridge portions on the belt side and the plurality of recessed grooves on the pulleys side. Thus, there is no possibility that the belt freely moves in the pulley axial direction with respect to the pair of front and rear pulleys. Combined with the fact that the flange portions sandwiching the both sides of the belt are not provided to the pair of front and rear pulleys, wear of and damage to the belt and generation of dust due to free movement of the belt in the pulley axial direction with respect to the pair of front and rear pulleys are also eliminated. On the other hand, the ridge portions in the width direction on the belt surface reduce the sliding resistance of the conveyed object (tray) in the belt width direction while increasing the sliding resistance in the belt longitudinal direction of the conveyed object (tray) with respect to the belt as described above. Thus, the sliding of the conveyed object (tray) to the lower side of the tilt at the time when the tilting conveyor unit is shifted from the horizontal orientation to the tilted orientation is performed smoothly without dragging the belt to the lower side of the tilt. Therefore, also in this respect, wear of and damage to the belt and generation of dust due to lateral movement of the belt in the width direction can also be suppressed.

When the present invention is carried out, it is desirably configured such that the ridge portions (47) on the belt inside surface have a trapezoidal cross sectional shape having a width becoming narrower toward a distal end side, and the recessed grooves (49) on the pulley circumferential surfaces have a shape with both inclined side surfaces abutting both inclined side surfaces of the ridge portions (47) on the belt inside surface, and only the respective both inclined side surfaces abut each other in a state where the ridge portions (47) on the belt inside surface are fitted into the recessed grooves (49) on the pulley circumferential surfaces. According to this configuration, it is effective at reliably suppressing relative sliding in the circumferential direction of the belt with respect to the pulley, and disadvantages due to not using the timing belt can be almost eliminated.

DETAILED DESCRIPTION OF THE INVENTION

Figure 1A:
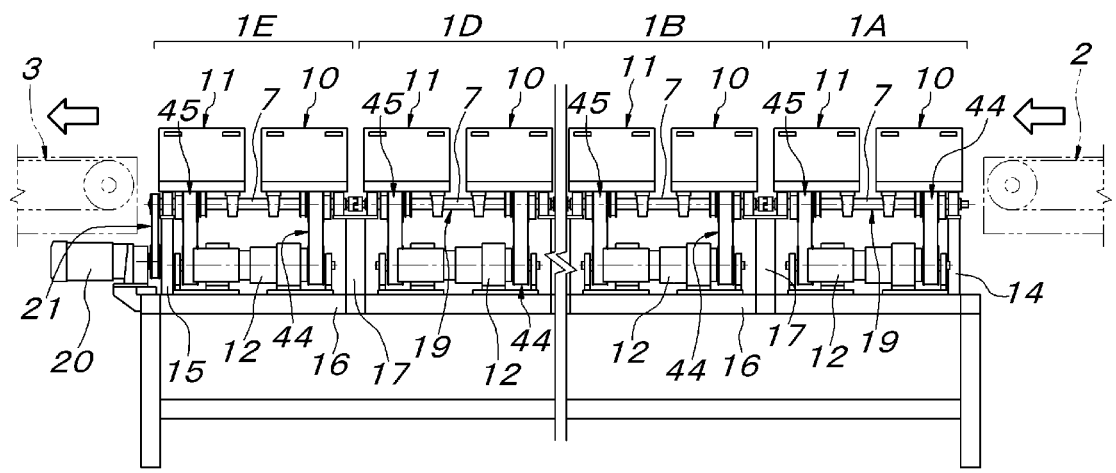
FIG. 1A is a partially omitted side view of a conveying and sorting apparatus.
Figure 1B:
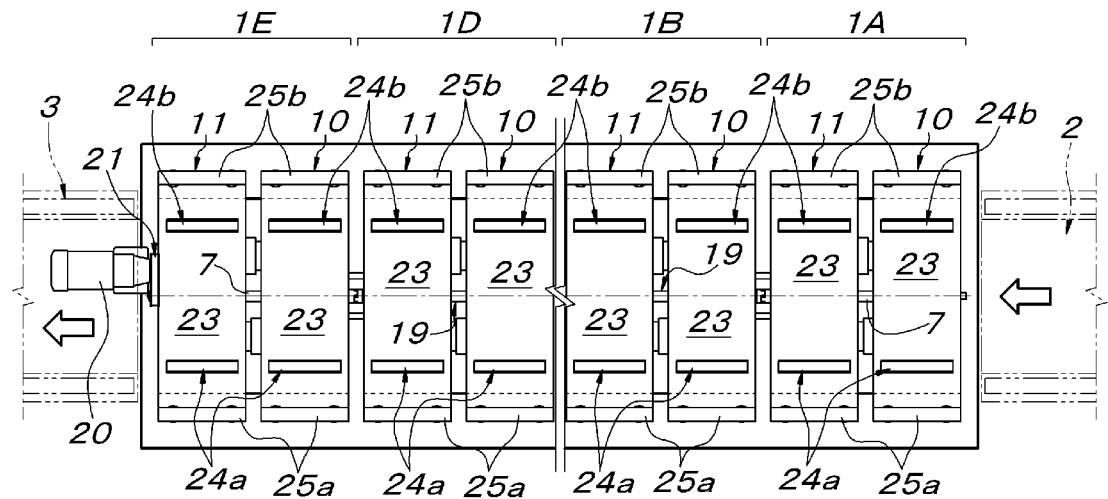
FIG. 1B is a plan view of the same.
Figure 2:
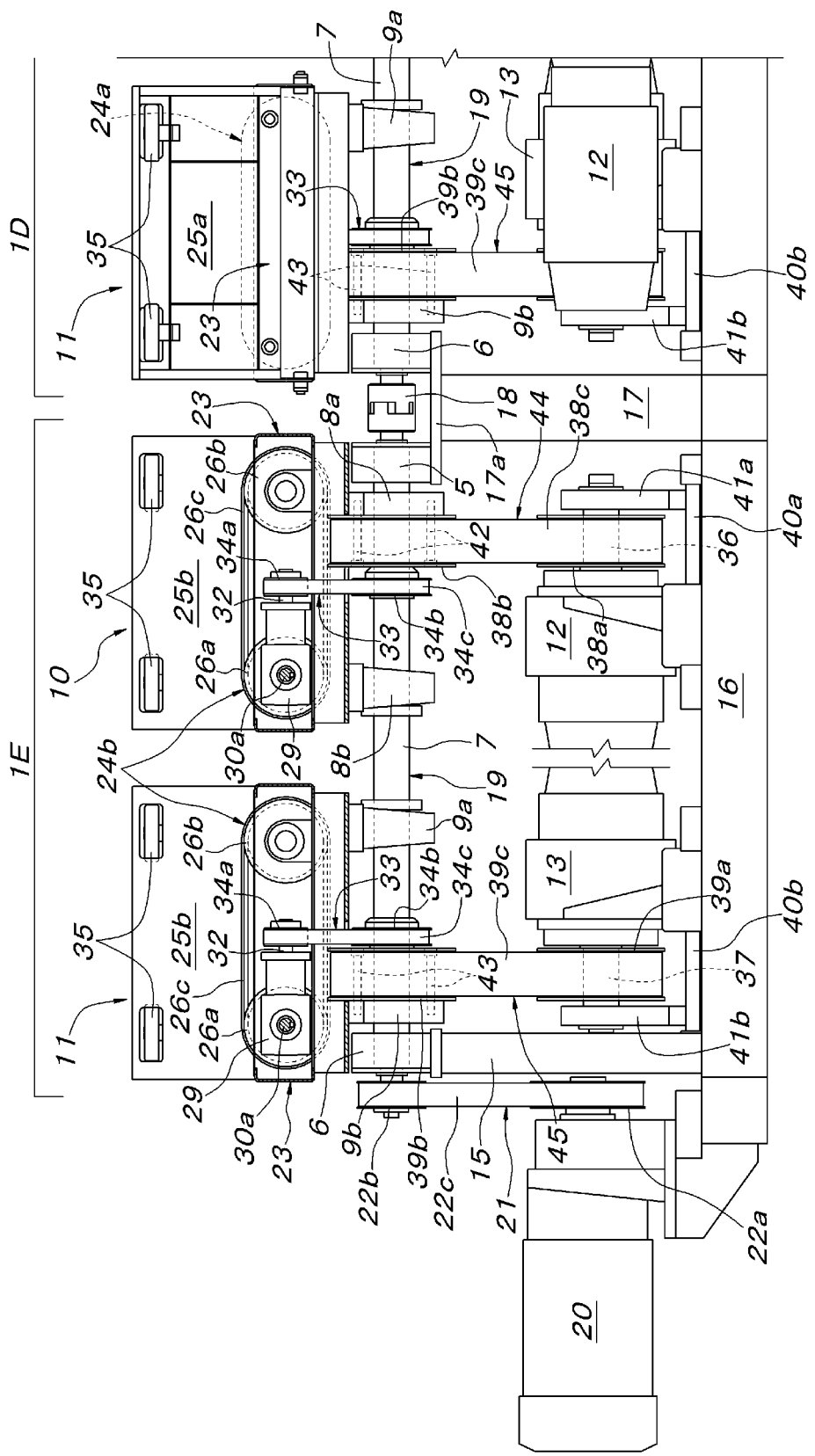
FIG. 2 is a side view of a main part showing an exit side area of the conveying and sorting apparatus.

FIG. 1A and FIG. 1B are a schematic side view and a plan view in which an illustration of a central assembly 1C of five assemblies 1A to 1E forming the conveying and sorting apparatus is omitted. A carry-in conveyor 2 is connected to an assembly 1A at an entrance side end portion, and a carry-out conveyor 3 is connected to an assembly 1E at an exit side end portion. In this embodiment, a sorting area is set at one or a plurality of locations on a conveying path for conveying a tray T loaded with a conveyed object. In this sorting area, the conveying and sorting apparatus according to the present invention is installed. The sorting of the conveyed object in this conveying and sorting apparatus is carried out by tilting the conveyed tray T in one of left and right sorting directions without stopping the movement in the conveying direction, and laterally and downwardly sliding and dropping the conveyed object loaded on the tray T from on top of the tray T by gravity. As a matter of course, the conveyed object can also be conveyed directly without using the tray T and sorted as above.

Hereinafter, a detailed structure of each assembly 1A to 1E is described based on FIG. 2 to FIG. 5. Each assembly 1A to 1E is composed of a support shaft 7 having both ends rotatably supported by a pair of bearings 5, 6 in the conveying direction of the conveyed object, being parallel to the conveying direction of the conveyed object conveying and sorting apparatus, and horizontally located at a central position in a left-right width direction of the conveyed object conveying and sorting apparatus, a pair of front and rear tilting conveyor units 10, 11 supported by a pair of front and rear bearings 8a, 8b and 9a, 9b on this support shaft 7, respectively, and two tilting motors 12, 13 individually switching the tilting conveyor units 10, 11 between a horizontal conveying orientation and a tilted orientation. The bearings 5, 6 located at both ends in the conveying direction of the conveying and sorting apparatus among the pair of front and rear bearings 5, 6 of each assembly 1A to 1E are each supported above a frame 16 by one columnar support member 14, 15. Two adjacent bearings 5, 6 between two adjacent assemblies are supported on a common columnar support member 17 via a pedestal 17a.

Figure 4:
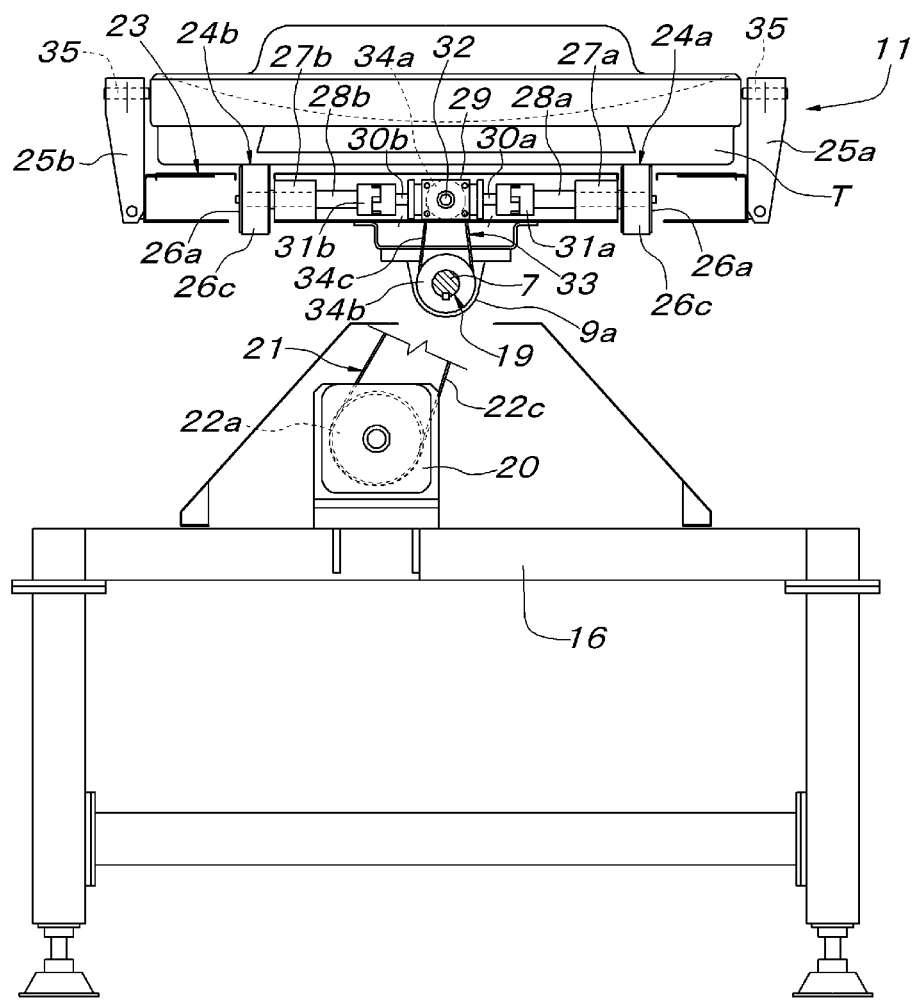
FIG. 4 is a partially cutaway front view showing the exit side of the conveying and sorting apparatus.

Between the two adjacent assemblies of the assemblies 1A to 1E, end portions of the support shafts 7 are concentrically interlockingly coupled to each other by a rotation transmitting joint 18, and a single interlocking transmission shaft 19 continuing over the overall length of the conveying and sorting apparatus is formed. As shown in FIG. 1A, FIG. 1B, and FIG. 4, at a free end of the support shaft 7 of the assembly 1E located at the exit side end portion of the conveying and sorting apparatus, one conveyor driving motor 20 supported by the frame 16 outside the assembly 1E is interlockingly coupled by a vertical winding transmission means 21. As the winding transmission means 21, a belt transmission means composed of a transmission-side pulley 22a, a driven-side pulley 22b, and an endless belt 22c stretched between both pulleys 22a, 22b is illustrated. However, the winding transmission means may be a winding transmission means using a chain.

Each tilting conveyor unit 10, 11 has the same structure and is composed of a structure 23 being horizontally long rectangular in plan view, a pair of left and right belt conveyors 24a, 24b for conveying the conveyed object provided to the structure 23, and side guides 25a, 25b attached along both left and right ends of the structure 23. The pair of left and right belt conveyors 24a, 24b are formed by stretching an endless belt 26c between a driving pulley 26a and a driven pulley 26b, and installed so that an upper conveying path portion of the endless belt 26c is exposed on an upper surface of the structure 23. A pair of left and right driving pulleys 26a located concentrically with each other are attached to outer end portions of a pair of left and right rotary shafts 28a, 28b supported in a left-right horizontal orientation by bearings 27a, 27b. Both rotary shafts 28a, 28b are interlockingly coupled, via rotation transmitting joints 31*a*, 31*b*, to output shafts 30*a*, 30*b* concentrically protruding to both left and right sides from a gear box 29 installed at a central position in the left-right width direction in the structure 23.

The gear box 29 includes a drive shaft 32 protruding rearward at the central position in the left-right width direction in the structure 23 and is configured such that both output shafts 30*a*, 30*b* are interlocked and rotated in the same direction at the same speed by the rotation of the drive shaft 32. The drive shaft 32 is interlockingly coupled to the interlocking transmission shaft 19 (the support shaft 7 of each assembly 1A to 1E) located directly below the drive shaft 32 by a winding transmission means 33. As the winding transmission means 33, a belt transmission means composed of a transmission-side pulley 34*a*, a driven-side pulley 34*b*, and an endless belt 34*c* stretched between both pulleys 34*a*, 34*b* is illustrated. However, the winding transmission means 33 may be a winding transmission means using a chain.

With the above configuration, by operating the one conveyor driving motor 20 installed at the exit side of the conveying and sorting apparatus, the pairs of left and right belt conveyors 24*a*, 24*b* provided to the pairs of front and rear tilting conveyor units 10, 11 of all of the assemblies 1A to 1E can be rotationally driven via the winding transmission means 33 and the gear boxes 29 from the interlocking transmission shaft 19 (the support shaft 7 of each assembly 1A to 1E) such that the tray T supported on the belt conveyors 24*a*, 24*b* is conveyed from the entrance side to the exit side of the conveying and sorting apparatus at a predetermined speed. In the tray T at this time, the conveying path is regulated at both left and right sides of the tray T by the side guides 25*a*, 25*b* erected on both left and right sides of each tilting conveyor unit 10, 11. Guide rollers 35 abutting and rolling on both left and right side surfaces of the tray T are pivotally supported at both front and rear end portions in the conveying direction of the side guides 25*a*, 25*b*.

Figure 3:
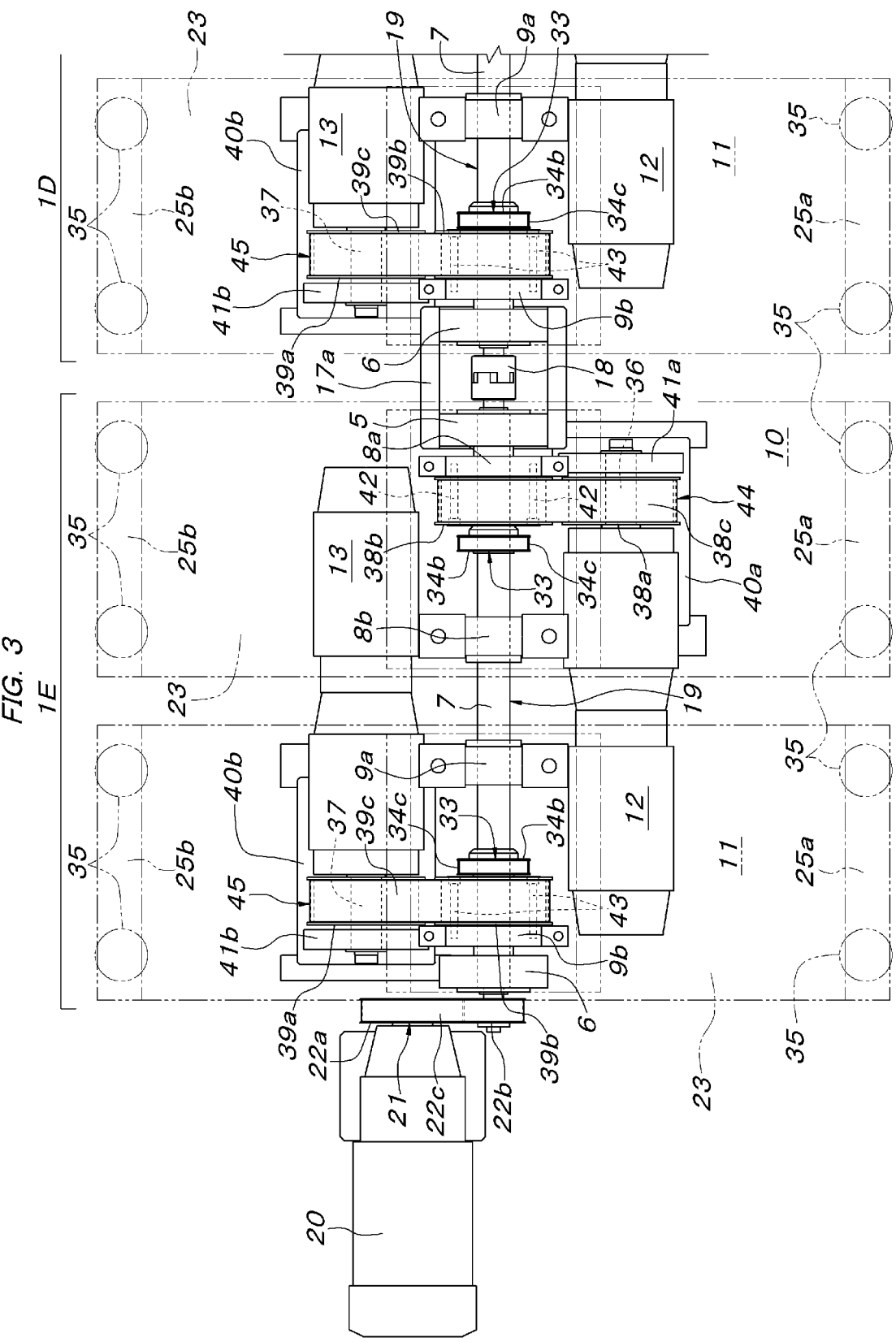
FIG. 3 is a plan view of the main part showing the exit side area of the conveying and sorting apparatus.

The pair of front and rear tilting conveyor units 10, 11 provided to the assemblies 1A to 1E are supported by the interlocking transmission shaft 19 (the support shaft 7 of each assembly 1A to 1E) via the pair of front and rear bearings 8*a* to 9*b*, respectively, so as to be tiltable in a direction along which both left and right end portions vertically move. In order to switch the tilting conveyor unit 10, 11 between the horizontal conveying orientation (see FIG. 5) supporting and conveying the tray T and the tilted orientation tilted about the support shaft 7, for example, about 45 degrees, in one of the left and right directions as shown in FIG. 6, the tilting motor 12, 13 is interlockingly coupled for every tilting conveyor unit 10, 11. For both tilting motors 12, 13, a speed reducer equipped with a large servomotor having an overall length in the axial center direction longer than the lateral width in the conveying direction of one tilting conveyor unit 10/11 and having a large driving torque is used. Thus, as shown in FIG. 3, the tilting motors 12, 13 are installed on the frame 16 so that the front and rear are reverse to each other at both left and right sides of the support shaft 7 in plan view and so that respective axial center directions become parallel to the support shaft 7.

More specifically, an output shaft 36, 37 of each tilting motor 12, 13 is attached with a transmission side timing belt pulley 38*a*, 39*a*. A free end portion of the output shaft 36, 37 protruding from the transmission side timing belt pulley 38*a*, 39*a* is supported by a bearing 41*a*, 41*b* attached on a mounting plate 40*a*, 40*b* supporting each tilting motor 12, 13. Thereby, the output shaft 36, 37 is made into a doubly supported structure. On the other hand, inside the bearings 5, 6 supporting both ends of the support shaft 7 of each assembly 1A to 1E, bearings 8*a*, 9*b* located on the outer side among the pair of front and rear bearings 8*a* to 9*b* for tiltably supporting each tilting conveyor unit 10, 11 by the support shaft 7 are adjacent. Further inside the bearings 8*a*, 9*b*, driven side timing belt pulleys 38*b*, 39*b* paired with the transmission side timing belt pulleys 38*a*, 39*a* are loosely fitted to the support shaft 7 so as to be relatively rotatable. These driven side timing belt pulleys 38*b*, 39*b* and the bearings 8*a*, 9*b* adjacent on the outer side are linked and integrated by a circumferential plurality of linking bolts 42, 43. Timing belts 38*c*, 39*c* serving as winding transmission tools are stretched around the transmission side timing belt pulleys 38*a*, 39*a*, and driven side timing belt pulleys 38*b*, 39*b*, and then winding transmission means 44, 45 using timing belts are thus configured. In other words, two tilting motors 12, 13 in an orientation in which the axial center direction is parallel to the support shaft 7 are installed on the frame 16 in a point symmetrical manner with respect to a central point in the length direction of the support shaft 7 at positions where the winding transmission means 44, 45 can be configured as above.

The mounting plate 40*a*, 40*b* supporting each tilting motor 12, 13 and the bearing 41*a*, 41*b* is mounted on the frame 16 so as to be positionally adjustable in the left-right lateral direction, and it is configured such that the tension adjustment of the timing belt 38*c*, 39*c* of the winding transmission means 44, 45 can be performed. The transmission-side pulley 34*b* of the winding transmission means 33 for transmitting the rotation of the interlocking transmission shaft 19 (the support shaft 7 of each assembly 1A to 1E) to the belt conveyors 24*a*, 24*b* of the tilting conveyor unit 10, 11 is attached to the support shaft 7 at a position adjacent to the inside of the driven side timing belt pulley 38*b*, 39*b* of the winding transmission means 44, 45, as shown in FIG. 3.

An example of a method of using the conveying and sorting apparatus configured as above will be described. As described above, the pairs of left and right belt conveyors 24*a*, 24*b* of the pair of front and rear tilting conveyor units 10, 11 provided to each assembly 1A to 1E are such that, by operating the one conveyor driving motor 20, its rotational force is transmitted to the driving pulleys 26*a* of the belt conveyors 24*a*, 24*b* via the winding transmission means 21 and the interlocking transmission shaft 19, and the winding transmission means 33, gear boxes 29, and rotary shafts 28*a*, 28*b* respectively corresponding to the tilting conveyor units 10, 11, and the endless belts 26*c* enter an operating state of rotating in a predetermined direction at a predetermined speed.

Figure 5:
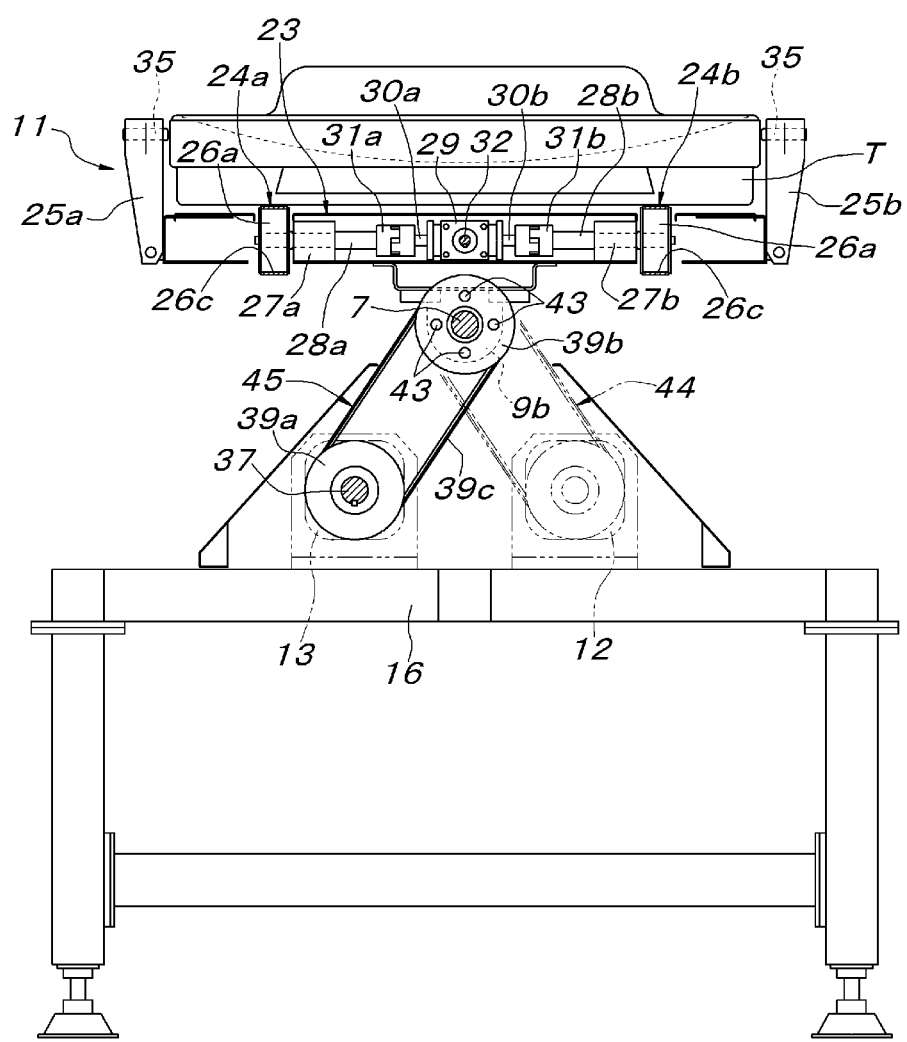
FIG. 5 is a longitudinal sectional rear view showing each assembly forming the conveying and sorting apparatus.
Figure 6:
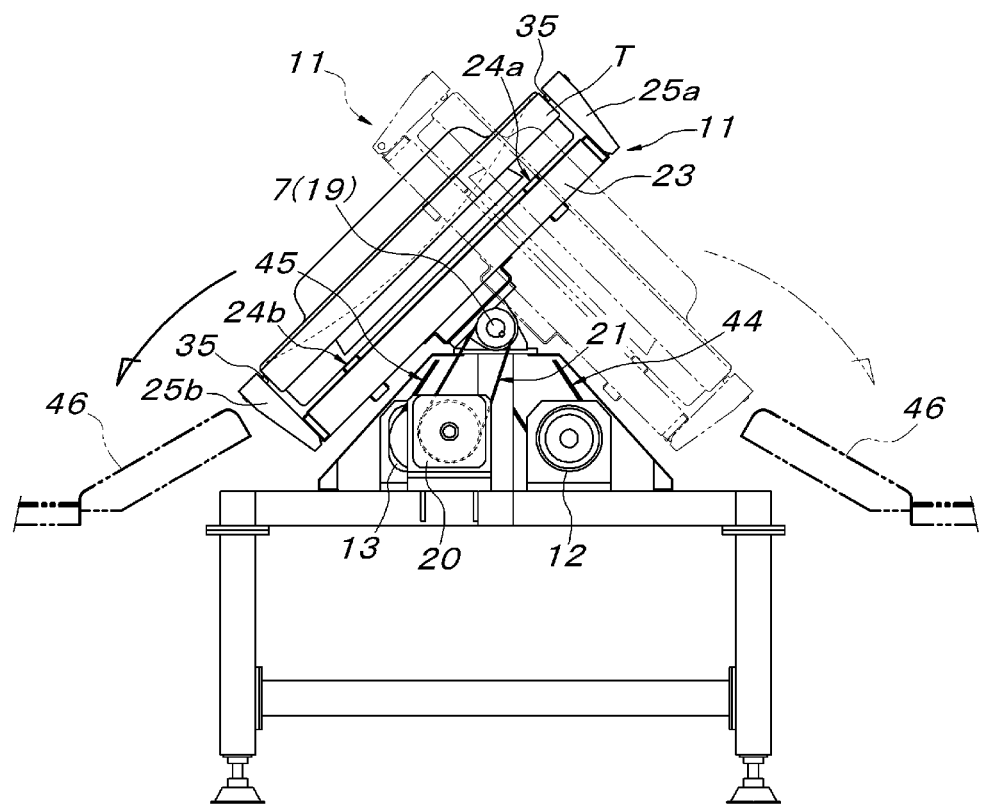
FIG. 6 is a front view showing a sorting operation of a tilting conveyor unit.

On the other hand, the tilting motors 12, 13 are stopped with the tilting conveyor units 10, 11 of all of the assemblies 1A to 1E being in the horizontal conveying orientation as shown in FIG. 5, so that the tilting conveyor units 10, 11 are held in the horizontal conveying orientation by the function of the tilting motors 12, 13 and do not swing about the support shaft 7/the interlocking transmission shaft 19 by gravity. Accordingly, with the tilting conveyor units 10, 11 of all of the assemblies 1A to 1E held in the horizontal conveying orientation, the conveyor driving motor 20 is operated as above to interlockingly rotationally drive the belt conveyors 24*a*, 24*b* in a predetermined conveying direction, and then the tray T loaded with the conveyed object sent in from the carry-in conveyor 2 shown in FIG.

1A and FIG. 1B can be conveyed toward the carry-out conveyor 3 at a constant speed and sent out onto the carry-out conveyor 3.

When a specific tilting conveyor unit 10, 11 is switched from the horizontal conveying orientation to the tilted orientation for sorting in a tray conveying state in which the belt conveyors 24a, 24b of the tilting conveyor units 10, 11 of all of the assemblies 1A to 1E are operated as above, the tilting motor 12/13 of the tilting conveyor unit 10/11 to be switched to the tilted orientation is operated and the rotation of its output shaft 36/37 is transmitted to the structure 23 of the target tilting conveyor unit 10/11 through the transmission side timing belt pulley 38a/39a, the timing belt 38c/39c, and the driven side timing belt pulley 38b/39b of the winding transmission means 44/45 and via the bearing 8a/9b linked and integrated by the linking bolts 42/43. Thereby, the target tilting conveyor unit 10/11 can be tilted about the support shaft 7 (the interlocking transmission shaft 19) in a predetermined direction by a rotation angle of the driven side timing belt pulley 38b/39b. When the tilting conveyor unit 10/11 in the tilted orientation is returned to the original horizontal conveying orientation, the tilting motor 12/13 of the tilting conveyor unit 10/11 is reversely rotated by the rotation angle at the time of tilting operation, and the tilting conveyor unit 10/11 can be returned from the tilted orientation to the original horizontal conveying orientation.

Figure 7:
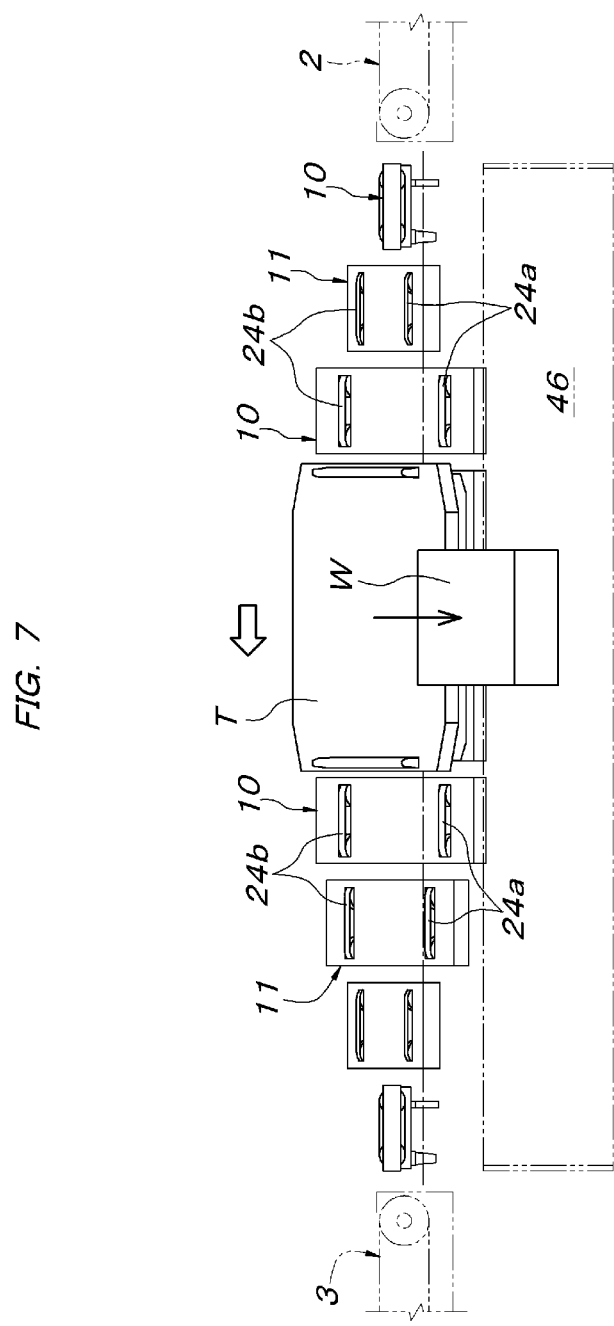
FIG. 7 is a schematic side view illustrating conveying and sorting operation of the conveying and sorting apparatus.
Figure 8A:
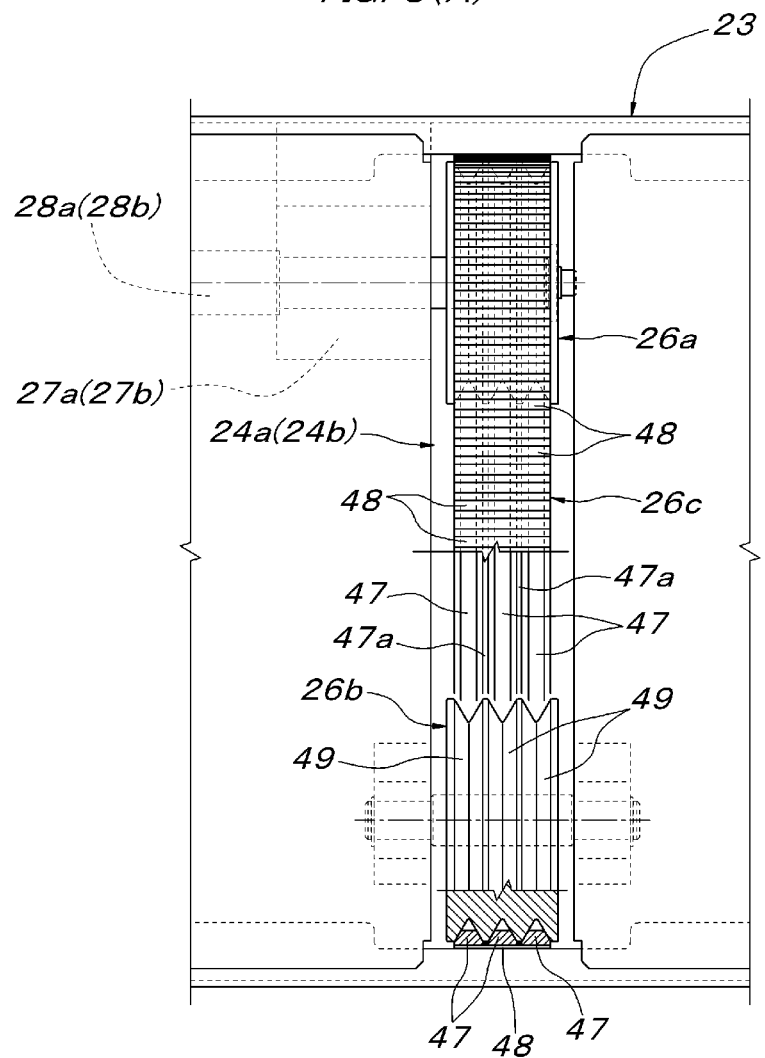
FIG. 8A is a partial cross sectional plan view of a main part showing an embodiment of the present invention.
Figure 8B:
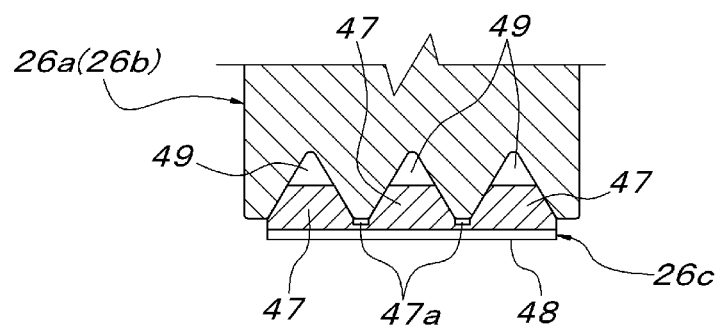
FIG. 8B is an enlarged view of the main part of FIG. 8A.
Figure 9A:
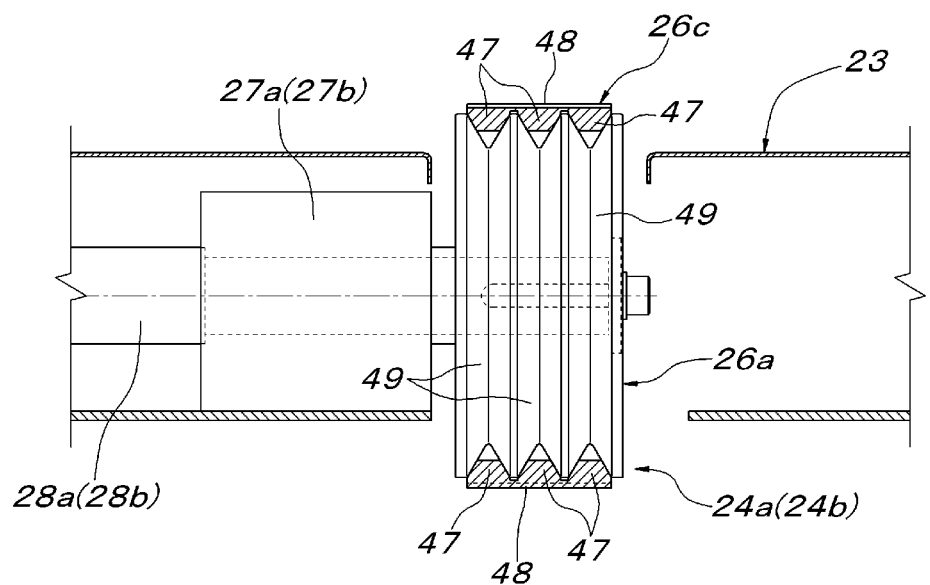
FIG. 9A is a longitudinal sectional front view of FIG. 8A.
Figure 9B:
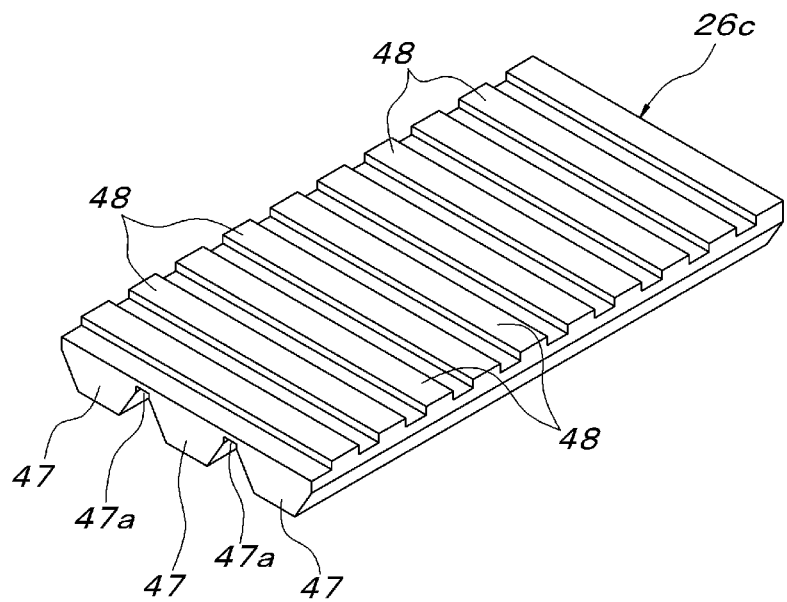
FIG. 9B is a perspective view showing a conveyor belt used.

When the conveyed object loaded on the tray T sent from the carry-in conveyor 2 is the target to be sorted at a certain place of the conveying and sorting apparatus, as shown in FIG. 7, at the point in time at which the tray T travels a certain distance from the carry-in conveyor 2, the required number of tilting conveyor units 10/11 located in an area supporting the tray T and on the downstream side of this area are swung from the horizontal orientation toward the sorting side to be switched to the tilted orientation, and the traveling tray T, which the tilting conveyor units support, is tilted to the sorting side by a required angle. As a result, the conveyed object W on the tray T slides on the tray T toward the lower side of the tilt by gravity and then slips off from on top of the tray T. Generally, a chute 46 taking over the conveyed object VV slipping off from on top of the tray T in the tilted orientation and guiding the object onto a target handling table is juxtaposed.

Even during the above-described sorting operation, the conveyance of the tray T is continued by the belt conveyors 24a, 24b provided to each tilting conveyor unit 10/11. Thus, the entire area of the tilting conveyor units 10/11 switched to the tilted orientation moves in the traveling direction of the tray T according to the conveying speed of the tray T, and the orientation of each tilting conveyor unit 10/11 is controlled such that the tilting conveyor units 10/11 having departed rearward from the area are sequentially returned from the tilted orientation to the horizontal orientation. Then, the tilting conveyor units 10/11 within the area supporting the tray T which completed the discharge of the conveyed object W for sorting are returned and swung from the tilted orientation to the horizontal orientation. Each tilting conveyor unit 10/11 on the downstream side of the area supporting the tray T is once swung downward from the horizontal orientation to an angle continuing with the tilting conveyor unit 10/11 in the process of returning to the horizontal orientation directly therebehind and then returned and swung to the horizontal orientation integrally with the tilting conveyor unit 10/11 in the process of returning to the horizontal orientation directly therebehind. By this series of operations, the tray T which completed the discharge of the conveyed object W for sorting is returned to the horizontal orientation while traveling at a predetermined speed, and is finally sent out onto the carry-out conveyor 3 in the horizontal orientation.

In the conveying and sorting apparatus configured and used as described above, the belt conveyors 24a, 24b provided to each tilting conveyor unit 10, 11 are configured as follows in accordance with the present invention. That is, as described above, the belt conveyors 24a, 24b are formed by stretching the endless belt 26c between the driving pulley 26a and the driven pulley 26b. Specifically, as shown in FIG. 8A to FIG. 9B, the endless belt 26c has an inside surface provided with a plurality of ridge portions 47 along a belt longitudinal direction at appropriate intervals in a belt width direction and has an outside surface provided with ridge portions 48 along the belt width direction at regular intervals in the belt longitudinal direction. The driving pulley 26a and the driven pulley 26b are not provided with flange portions sandwiching both sides of the endless belt 26c and are provided, on circumferential surfaces, with a plurality of recessed grooves 49 into which the ridge portions 47 on the belt inside surface are individually fitted.

The ridge portions 47 on the inside surface of the endless belt 26c have a trapezoidal cross sectional shape having a width becoming narrower toward a distal end side, and the recessed grooves 49 on the pulleys 26a, 26b side have a triangular cross section in which both side surfaces thereof are inclined at the same angle with both inclined side surfaces of the ridge portions 47. The recessed grooves 49 can have a trapezoidal shape in cross section in which the innermost portion is a flat surface. In other words, it is desirably configured such that the ridge portions 47 on the inside surface of the belt 26c have a shape with both inclined side surfaces opened toward the distal end side, and the recessed grooves 49 on the circumferential surfaces of the pulleys 26a, 26b have a shape with both inclined side surfaces abutting the both inclined side surfaces of the ridge portions 47 on the belt inside surface, and only the respective both inclined side surfaces abut each other in a state where the ridge portions 47 on the belt inside surface are fitted into the recessed grooves 49 on the pulley circumferential surfaces. That is, in order that the both inclined side surfaces of the ridge portions 47 and the both inclined side surfaces of the recessed grooves 49 are reliably closely contacted by the tension acting on the endless belt 26c, the ridge portions 47 and the recessed grooves 49 form shapes that the distal ends of the ridge portions 47 and bottom portions of the recessed grooves 49 do not hit against each other and shapes that valley bottom portions between the ridge portions 47 and crest portions between the recessed grooves 49 do not hit against each other. Specifically, the ridge portions 47 form a trapezoid in cross section, and bottom portions between the ridge portions 47 are formed with recessed groove portions 47a rectangular in cross section. The recessed grooves 49 form a triangle in cross section and the crest portions between the recessed grooves 49 also form a triangle in cross section.

According to the belt conveyors 24a, 24b having the above configuration, for example, by positionally adjusting the driven pulley 26b in a far and near direction with respect to the driving pulley 26a to cause a predetermined tension on the endless belt 26c, the frictional force in the circumferential direction of the endless belt 26c with respect to the driving pulley 26a is significantly increased, and the endless belt 26c is substantially eliminated from sliding in the circumferential direction with respect to the driving pulley 26a. Thus, the endless belt 26c can be rotationally driven reliably at a predetermined speed by the driving pulley 26a equivalent to the case of using the timing belt as the endless belt 26c. That is, as described above, by rotationally driving the driving pulley 26a to rotate the endless belt 26c in a predetermined direction, the tray T supported can be reliably conveyed in a predetermined direction at a predetermined speed.

Further, when the sorting operation that the tilting conveyor units 10, 11 are changed from the horizontal orientation to the tilted orientation to tilt the tray T in the course of being conveyed, thereby sliding and discharging the conveyed object on the tray T to the lower side of the tilt by gravity is performed, the tray T slides on the belt conveyors 24a, 24b to the lower side of the tilt within a play allowance corresponding to a difference between the lateral width of the tray T and the width between both left and right side guides 25a, 25b of the tilting conveyor unit 10, 11 (the width between the guide rollers 35). At this time, the flat bottom surface of the tray T slides on upper surfaces of the ridge portions 48 of the endless belt 26c in the longitudinal direction of the ridge portions 48. Thus, the sliding resistance is small as compared with the case where the bottom surface slides on the upper surface of the flat endless belt 26c without the ridge portions 48.

That is, the force of the tray T that slides to the lower side of the tilt to draw the endless belt 26c to the lower side of the tilt via the frictional force between the bottom surface of the tray T and the upper surface of the endless belt 26c (the upper surfaces of the ridge portions 48) is very small. Moreover, the endless belt 26c is in a state where the movement in the axial direction of the both front and rear pulleys 26a, 26b with respect to the pulleys 26a, 26b is strongly blocked by the fitting of the ridge portions 47 and the recessed grooves 49. Therefore, the endless belt 26c never follows the tray T sliding to the lower side of the tilt and moves to the lower side of the tilt with respect to the both front and rear pulleys 26a, 26b. For the above reasons, it is eliminated that the sides of the endless belt 26c of the belt conveyor 24a, 24b slidingly contact with positioning flanges attached on both sides of the pulley 26a, 26b as in the case of using the timing belt, and dust is generated and the sides of the endless belt 26c are severely worn.

INDUSTRIAL APPLICABILITY

The conveying and sorting apparatus of the present invention can be utilized as a conveyed object conveying and sorting apparatus such that the conveyed object is loaded and conveyed on a dedicated conveying tray and also required to be sorted automatically according to the destination, as in the luggage conveyance and sorting at airports.

What is claimed is:

1. A conveying and sorting apparatus comprising:
a plurality of tilting conveyor units arranged in a row in a conveying direction, each of the tilting conveyor units configured to be switchable in orientation about a support shaft parallel to a conveying direction of a conveyed object between an horizontal conveying orientation and a tilted orientation for discharging the conveyed object laterally with respect to the conveying direction of the conveyed object by gravity, and also including a conveying conveyor for the conveyed object;
the conveying conveyor having a belt conveyor with a belt stretched between a pair of front and rear pulleys, and the belt of the belt conveyor has an inside surface provided with a plurality of ridge portions along a belt longitudinal direction at intervals in a belt width direction and has an outside surface provided with ridge portions along the belt width direction at regular intervals in the belt longitudinal direction, and the pair of front and rear pulleys are not provided with flange portions sandwiching both sides of the belt and are provided, on circumferential surfaces, with a plurality of recessed grooves into which the ridge portions on the belt inside surface are individually fitted; and
the ridge portions along the width direction of the outside surface of the belt are formed in a rectangular cross-sectional shape having a flat top surface parallel to the longitudinal direction and the width direction of the belt.

\* \* \* \* \*